United States Patent
Cheng et al.

(10) Patent No.: US 11,032,760 B2
(45) Date of Patent: Jun. 8, 2021

(54) SCELL SELECTION FOR BEAM FAILURE RECOVERY

(71) Applicant: FG Innovation Company Limited, Tuen Mun (CN)

(72) Inventors: Yu-Hsin Cheng, Hsinchu (TW); Chie-Ming Chou, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 13 days.

(21) Appl. No.: 16/290,826

(22) Filed: Mar. 1, 2019

(65) Prior Publication Data
US 2019/0274098 A1 Sep. 5, 2019

Related U.S. Application Data

(60) Provisional application No. 62/637,735, filed on Mar. 2, 2018.

(51) Int. Cl.
*H04W 48/20* (2009.01)
*H04W 84/04* (2009.01)
*H04W 24/04* (2009.01)

(52) U.S. Cl.
CPC ............ *H04W 48/20* (2013.01); *H04W 24/04* (2013.01); *H04W 84/045* (2013.01)

(58) Field of Classification Search
CPC .............. H04L 5/0048; H04W 36/04; H04W 36/0072; H04W 74/00; H04W 24/04; H04W 48/20; H04W 84/045; H04B 7/0695
See application file for complete search history.

(56) References Cited

U.S. PATENT DOCUMENTS

| 10,587,363 | B2* | 3/2020 | Zhou ................... H04L 27/2692 |
| 2017/0078931 | A1* | 3/2017 | Yoshizawa ............ H04W 36/04 |
| 2018/0084446 | A1* | 3/2018 | Li .......................... H04W 24/08 |
| 2018/0138962 | A1* | 5/2018 | Islam ..................... H04L 5/0032 |
| 2019/0037604 | A1* | 1/2019 | Akkarakaran ...... H04W 74/008 |
| 2019/0053288 | A1* | 2/2019 | Zhou ..................... H04B 7/0695 |
| 2019/0053314 | A1* | 2/2019 | Zhou ..................... H04B 7/0626 |
| 2019/0075524 | A1* | 3/2019 | Zhou ................. H04W 72/0406 |
| 2019/0081753 | A1* | 3/2019 | Jung ..................... H04B 7/0628 |
| 2019/0089447 | A1* | 3/2019 | Sang ................. H04W 56/0035 |
| 2019/0166539 | A1* | 5/2019 | Chen .................... H04W 36/36 |
| 2019/0190582 | A1* | 6/2019 | Guo ....................... H04L 5/0048 |
| 2019/0200248 | A1* | 6/2019 | Basu Mallick ..... H04L 41/0672 |
| 2019/0207667 | A1* | 7/2019 | Zhou ..................... H04L 1/0009 |
| 2019/0215048 | A1* | 7/2019 | Cirik ...................... H04B 7/088 |

(Continued)

FOREIGN PATENT DOCUMENTS

| CN | 107005858 A | 8/2017 |
| CN | 107079459 X | 8/2017 |
| WO | 2016140599 A | 9/2016 |

*Primary Examiner* — Melanie Jagannathan
(74) *Attorney, Agent, or Firm* — ScienBiziP, P.C.

(57) ABSTRACT

A method for beam failure recovery (BFR) by a user equipment (UE) is disclosed. The method includes receiving, by the UE, an instruction for BFR from a base station, and selecting, by the UE, at least one of a plurality of secondary cells (SCells) to perform BFR based on the instruction. The instruction is contained in a radio resource control (RRC) message, a medium access control (MAC) control element (CE) (MAC-CE), or downlink control information (DCI).

14 Claims, 7 Drawing Sheets

(56) References Cited

U.S. PATENT DOCUMENTS

| | | | |
|---|---|---|---|
| 2019/0215706 A1* | 7/2019 | Tsai | H04W 72/042 |
| 2019/0230529 A1* | 7/2019 | Sadiq | H04B 7/04 |
| 2019/0230545 A1* | 7/2019 | Liou | H04W 24/10 |
| 2019/0245737 A1* | 8/2019 | Zhou | H04B 7/06 |
| 2019/0253941 A1* | 8/2019 | Cirik | H04W 36/0072 |
| 2019/0253986 A1* | 8/2019 | Jeon | H04W 72/042 |
| 2019/0281480 A1* | 9/2019 | Wei | H04B 7/06 |
| 2019/0356376 A1* | 11/2019 | You | H04W 56/001 |
| 2020/0059398 A1* | 2/2020 | Pan | H04L 41/0654 |
| 2020/0127883 A1* | 4/2020 | Liu | H04W 72/0453 |
| 2020/0137750 A1* | 4/2020 | Song | H04W 72/0413 |
| 2020/0205193 A1* | 6/2020 | Amuru | H04W 16/28 |
| 2021/0014920 A1* | 1/2021 | Chen | H04B 7/0695 |
| 2021/0021321 A1* | 1/2021 | Liu | H04W 72/0413 |

* cited by examiner

SCELL SELECTION FOR BEAM FAILURE RECOVERY

CROSS-REFERENCE TO RELATED APPLICATION(S)

The present application claims the benefit of and priority to a provisional U.S. Patent Application Ser. No. 62/637,735 filed on Mar. 2, 2018 entitled "SCELL SELECTION FOR BEAM FAILURE RECOVERY", (hereinafter referred to as "US73343 application"). The disclosure of the US73343 application is hereby incorporated fully by reference into the present application.

FIELD

The present disclosure generally relates to wireless communication methods, and more particularly, secondary cell (SCell) selection for beam failure recovery in a wireless communication system.

BACKGROUND

In order to achieve high throughput and low latency communication in the next generation (e.g., the fifth generation (5G) New Radio (NR)) wireless networks, millimeter wave (mWave) beams and phase array antennas are being developed to provide the abilities to form, scan, and steer directional beams for wireless communication. Before a base station and a UE can start data communication, an initial beam alignment needs to be performed to align a base station beam with a UE beam. Subsequently, beam tracking is needed to ensure that the beams continue to be aligned during data communication. When a beam failure is detected (e.g., when the quality between the base station beam and UE beam falls below a predefined threshold), a beam failure recovery procedure may be triggered. Conventionally, beam failure recovery is only performed on a serving cell (e.g., a primary cell (PCell). However, since carrier aggregation may be configured in a 5G NR wireless network, a PCell and one or more SCells may be formed as a set of serving cells. Thus, there is a need in the art for beam failure management to enable a UE to select one or more of the SCells to recover from beam failure.

SUMMARY

The present application is directed to SCell selection for beam failure recovery.

In a first aspect of the present application, a method for beam failure recovery (BFR) by a user equipment (UE) is provided. The method includes receiving, by the UE, an instruction for BFR from a base station; selecting, by the UE, at least one of a plurality of secondary cells (SCells) to perform BFR based on the instruction.

In an implementation of the first aspect, the instruction is configured by a base station.

In another implementation of the first aspect, the instruction is contained in a radio resource control (RRC) message, a medium access control (MAC) control element (CE) (MAC-CE), or downlink control information (DCI).

In yet another implementation of the first aspect, the instruction includes an explicit indicator indicating whether each of the plurality of SCells supports BFR, and the explicit indicator is included in the RRC message.

In yet another implementation of the first aspect, the instruction includes an explicit indicator indicating whether each of the plurality of SCells supports BFR based on a corresponding SCell ID in the MAC-CE.

In yet another implementation of the first aspect, the instruction includes an implicit indicator indicating whether each of the plurality of SCells supports BFR based on a corresponding BFR-related RRC parameter in the RRC signaling, and the BFR-related RRC parameter contains at least one of: one or more BFR-candidate-reference signals; a beam-failure-candidate-beam-threshold; or one or more reference signal identifiers (IDs) for failure detection resources (failureDetectionResources).

In yet another implementation of the first aspect, the instruction includes one or more implicit indicators each corresponding to an absolute radio frequency channel number (AFRCN) value in frequencyInfoDL of each of the plurality of SCells; an SCell having a higher ARFCN value has a higher priority over an SCell having a lower ARFCN value to perform BFR.

In yet another implementation of the first aspect, the UE selects the at least one of the plurality of SCells, when the instruction indicates that one or more BFR-related parameters are configured for the at least one of the plurality of SCells; the one or more BFR-related parameters contain at least one of: one or more BFR-candidate-reference signals; a beam-failure-candidate-beam-threshold; or one or more reference signal identifiers (IDs) for failure detection resources (failureDetectionResources).

In yet another implementation of the first aspect, the instruction includes at least one of: a list of SCell identifiers (IDs) corresponding to the plurality of SCells; or one or more BFR-related parameters.

In yet another implementation of the first aspect, the instruction includes a carrier frequency indicator (CFI) information element (IE), and the UE selects the at least one of the plurality of SCells based on the CFI IE.

In yet another implementation of the first aspect, the plurality of SCells is grouped into at least one subset based on: an explicit indication in RRC signaling; an implicit indication based on an order of SCellIDs in an SCellID list; an absolute radio frequency channel number (AFRCN) value in frequencyInfoDL; a frequency range (FR); or a preamble of contention free random access (CFRA) for BFR, the preamble having one or more SCellIDs corresponding to one or more SCells detecting beam failures.

In yet another implementation of the first aspect, when the preamble of CFRA for BFR does not contain any of the one or more SCellIDs, the base station considers all of the at least one subset of the plurality of SCells as detecting beam failure.

In a second aspect of the present application, a user equipment (UE) is provided. The UE includes one or more non-transitory computer-readable media having computer-executable instructions embodied thereon; at least one processor coupled to the one or more non-transitory computer-readable media, and configured to execute the computer-executable instructions to: receive an instruction for beam failure recovery (BFR) from a base station; select at least one of a plurality of secondary cells (SCells) to perform BFR based on the instruction.

In an implementation of the second aspect, the instruction is contained in a radio resource control (RRC) message, a medium access control (MAC) control element (CE) (MAC-CE), or downlink control information (DCI).

In another implementation of the second aspect, the instruction includes an explicit indicator indicating whether each of the plurality of SCells supports BFR, and the explicit indicator is included in the RRC message.

In yet another implementation of the second aspect, the instruction includes an explicit indicator indicating whether each of the plurality of SCells supports BFR based on a corresponding SCell ID in the MAC-CE.

In yet another implementation of the second aspect, the instruction includes an implicit indicator indicating whether each of the plurality of SCells supports BFR based on a corresponding BFR-related RRC parameter in the RRC signaling; the BFR-related RRC parameter contains at least one of: one or more BFR-candidate-reference signals; a beam-failure-candidate-beam-threshold; or one or more reference signal identifiers (IDs) for failure detection resources (failureDetectionResources).

In yet another implementation of the second aspect, the instruction includes one or more implicit indicators each corresponding to an absolute radio frequency channel number (AFRCN) value in frequencyInfoDL of each of the plurality of SCells; an SCell having a higher ARFCN value has a higher priority over an SCell having a lower ARFCN value to perform BFR.

In yet another implementation of the second aspect, the UE selects the at least one of the plurality of SCells, when the instruction indicates that one or more BFR-related parameters are configured for the at least one of the plurality of SCells; the one or more BFR-related parameters contain at least one of: one or more BFR-candidate-reference signals; a beam-failure-candidate-beam-threshold; or one or more reference signal identifiers (IDs) for failure detection resources (failureDetectionResources).

In yet another implementation of the second aspect, the instruction includes at least one of: a list of SCell identifiers (IDs) corresponding to the plurality of SCells; or one or more BFR-related parameters.

In yet another implementation of the second aspect, the instruction includes a carrier frequency indicator (CFI) information element (IE), and the UE selects the at least one of the plurality of SCells based on the CFI IE.

In yet another implementation of the second aspect, the plurality of SCells is grouped into at least one subset based on an explicit indication in RRC signaling; an implicit indication based on an order of SCellIDs in an SCellID list; an absolute radio frequency channel number (AFRCN) value in frequencyInfoDL; a frequency range (FR); or a preamble of contention free random access (CFRA) for BFR, the preamble having one or more SCellIDs corresponding to one or more SCells detecting beam failures.

In yet another implementation of the second aspect, when the preamble of CFRA for BFR does not contain any of the one or more SCellIDs, the base station considers all of the at least one subset of the plurality of SCells as detecting beam failure.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

DETAILED DESCRIPTION

Figure 1:
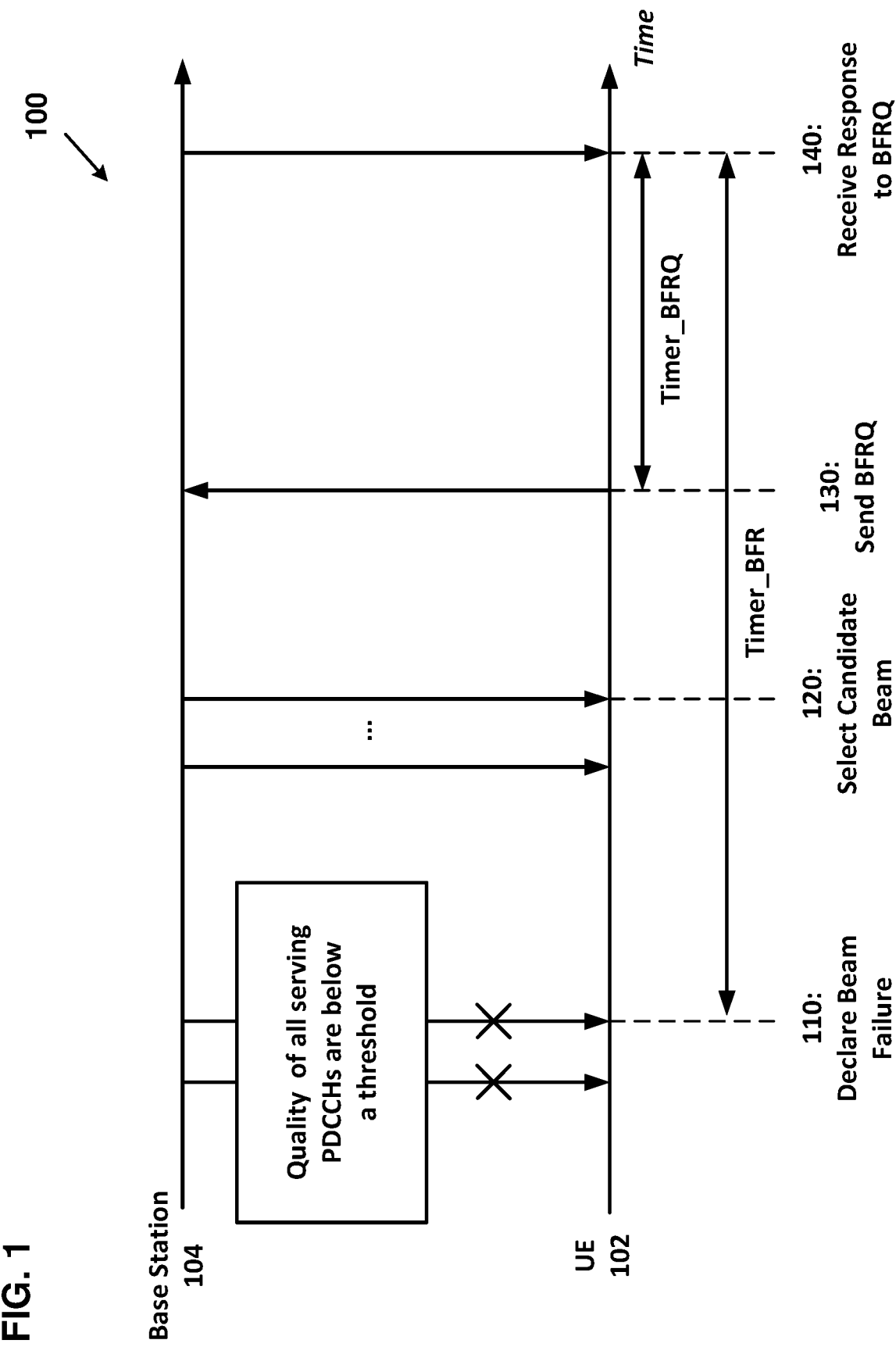
FIG. 1 is a schematic diagram of a beam failure recovery procedure in a wireless communication system, in accordance with an example implementation of the present application.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the example figures. However, the features in different implementations may be differed in other respects, and thus shall not be narrowly confined to what is shown in the figures.

References to "one implementation," "an implementation," "example implementation," "various implementations," "some implementations," "implementations of the present application," etc., may indicate that the implementation(s) of the present application so described may include a particular feature, structure, or characteristic, but not every possible implementation of the present application necessarily includes the particular feature, structure, or characteristic. Further, repeated use of the phrase "in one implementation," or "in an example implementation," "an implementation," do not necessarily refer to the same implementation, although they may. Moreover, any use of phrases like "implementations" in connection with "the present application" are never meant to characterize that all implementations of the present application must include the particular feature, structure, or characteristic, and should instead be understood to mean "at least some implementations of the present application" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

A radio communication network architecture (e.g., a long term evolution (LTE) system, a LTE-Advanced (LTE-A) system, or a LTE-Advanced Pro system) typically includes at least one base station, at least one UE, and one or more optional network elements that provide connection towards a network. The UE communicates with the network (e.g., a core network (CN), an evolved packet core (EPC) network, an Evolved Universal Terrestrial Radio Access network (E-UTRAN), a Next-Generation Core (NGC), or an internet), through a radio access network (RAN) established by the base station.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a personal digital assistant (PDA) with wireless communication capability. The UE is configured to receive and transmit signals over an air interface to one or more cells in a radio access network.

A base station may include, but is not limited to, a node B (NB) as in the UMTS, an evolved node B (eNB) as in the LTE-A, a radio network controller (RNC) as in the UMTS, a base station controller (BSC) as in the GSM/GERAN, an NG-eNB as in an E-UTRA base station in connection with the 5GC, a next generation node B (gNB) as in the 5G-AN, and any other apparatus capable of controlling radio communication and managing radio resources within a cell. The base station may connect to serve the one or more UEs through a radio interface to the network.

A base station may be configured to provide communication services according to at least one of the following radio access technologies (RATs): Worldwide Interoperability for Microwave Access (WiMAX), Global System for Mobile communications (GSM, often referred to as 2G), GSM EDGE radio access Network (GERAN), General Packet Radio Service (GRPS), Universal Mobile Telecommunication System (UMTS, often referred to as 3G) based on basic wideband-code division multiple access (W-CDMA), high-speed packet access (HSPA), LTE, LTE-A, eLTE (evolved LTE), New Radio (NR, often referred to as 5G), and/or LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting proximity service (ProSe). Each cell may have overlapped coverage areas with other cells.

As discussed above, the frame structure for NR is to support flexible configurations for accommodating various next generation (e.g., 5G) communication requirements, such as enhanced mobile broadband (eMBB), massive machine type communication (mMTC), ultra-reliable communication and low latency communication (URLLC), while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP), may also be used. Additionally, two coding schemes are considered for NR: (1) low-density parity-check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resource may also be provided in an NR frame to support ProSe services.

FIG. 1 is a schematic diagram 100 of a beam failure recovery procedure in a wireless communication system according to an exemplary implementation of the present disclosure. The wireless communication system includes one or more UEs (e.g., UE 102) and one or more base stations (e.g., base station 104). The base station 104 configures a control channel (e.g., physical downlink control channel (PDCCH)) for the UE 102 to monitor for receiving downlink (DL) data via a control resource set (CORESET) configuration. The UE 102 monitors the quality of all the serving PDCCHs by measuring configured reference signals (RSs). A beam failure recovery procedure may be trigger when the quality of all of the serving PDCCHs are lower than a predetermined threshold. In one implementation, the quality of a PDCCH may be represented by a pre-configured synchronization signal (SS) block. In another implementation, the quality of a PDCCH may be represented by a channel state information reference signal (CSI-RS). As shown in FIG. 1, in action 110, when the UE 102 identifies that the quality of all serving PDCCHs are below the predetermined threshold, a beam failure is declared by the UE 102. Thus, a beam failure recovery procedure is triggered.

In action 120, the UE 102 monitors all candidate RSs to select a new qualified beam for recovery. In action 130, the UE 102 sends a beam failure recovery request (BFRQ) to the BS. Afterwards, the UE 102 monitors for a BFRQ Response. In action 140, the UE 102 receives the BFRQ Response.

To conserve time and resources for the beam failure recovery procedure, a timer (e.g., a beam-failure-recovery-timer (timer_BFR)) may be utilized for beam failure recovery. The timer_BFR starts when a beam failure is declared (e.g., in action 110), and the timer_BFR stops when the UE 102 successfully receives a BFRQ Response (e.g., in action 140). For example, the BFRQ Response may be considered to be successfully received when the UE detects a DCI format with CRC scrambled by C-RNTI or MCS-C-RNTI in the search space set provided by recoverySearchSpaceId. If the UE 102 cannot recover (e.g., complete the beam failure recovery procedure successfully) before the timer_BFR expires, the UE 102 may consider the beam failure recovery procedure failed, and stop the beam failure recovery procedure. Also, another timer (e.g., a beam-failure-recovery-request-timer (timer_BFRQ)) may be utilized for monitoring the BFRQ Response to prevent the UE 102 from waiting for the BFRQ Response indefinitely. The timer_BFRQ starts when a BFRQ is sent (e.g., in action 130), and the timer_BFRQ stops when the UE 102 successfully receives the BFRQ Response (e.g., in action 140). If the UE 102 fails to successfully receive the BFRQ Response before the timer_BFRQ expires, the UE 102 retransmits the BFRQ and keeps monitoring the PDCCH. Once the timer_BFR expires or the UE 102 reaches the maximum number of BFRQ retransmissions, the beam failure recovery procedure is considered failed. The UE 102 may then trigger a radio link failure (RLF) procedure and start an RRC connection re-establishment.

In various implementations of the present application, the UE 102 may decide to perform BFR based on channel conditions of one or more SCells. The base station 104 (e.g., a serving base station) may be in communication with the UE 102 through one or more radio links (e.g., serving beam pair links) associated with one or more control channels (e.g., control channel beams). The BFR procedure may be triggered when all of the serving control channels between the base station 104 and the UE 102 fail.

In various implementations of the present application, one or more SCells may support BFR. That is, the UE 102 may perform BFR on one or more SCells.

In one implementation, the UE 102 may select one or more SCell(s) based on Layer-1 reference signal received power (L1-RSRP) of the Radio Link Monitoring-Reference Signals (RLM-RSs) configured for each SCell.

The UE 102 may determine in which SCell(s) to perform BFR based on the measured results of all configured reference signals (e.g., channel state information reference signal(s) (CSI-RS(s)) or synchronization signal block(s) (SSB(s))) which are spatially quasi-collocated (QCL'ed) with the corresponding control channel(s) (e.g., Physical Downlink Control Channel (PDCCH)). For example, the UE 102 may compare the measured results of each SCell with an average or maximum L1-RSRP of each configured reference signal which is spatially QCL'ed with the corresponding PDCCH. In another example, the UE may compare the measured results of each SCell with a Signal to Interference plus Noise Ratio (SINR) of each configured reference signal which is spatially QCL'ed with the corresponding PDCCH.

In some implementations, the UE 102 may select one or more SCells based on the frequency band(s) of each SCell. In one implementation, the UE 102 may prefer using an SCell at a lower frequency band to perform BFR over an SCell at a higher frequency band, since lower frequency bands allow wider beam width for beamforming than higher frequency bands. Hence, it may be easier or more practical to perform BFR on an SCell at a low frequency band, while an SCell at a high frequency may be assisted by the PCell. In another implementation, the UE 102 may prefer using an SCell at a higher frequency band to perform BFR over an SCell at a lower frequency band because larger sub-carrier spacing (SCS) may be applied in higher frequency bands.

In some implementations, the base station 104 may configure a set of rules and/or parameters for selecting SCell(s) for BFR. The rules may include the order of SCells (e.g., a cell list) by which the UE 102 may perform BFR. This may be achieved by using an RRC parameter (e.g., a BFR related RRC parameter), such as BFR-On-SCell-Order, configured by the base station 104 in a BFR configuration, or an SCell configuration of RRC signaling.

The BFR-On-SCell-Order may include a list of SCellIDs. The UE 102 may perform BFR on one or more SCells based on the order of the list. For example, the list includes SCell #1, SCell #3, SCell #4, if SCell #1 and SCell #4 detect beam failure, at least one of SCell #1 and SCell #4 may perform BFR on SCell. In another implementation, in a case where the base station 104 configures only one SCell for performing BFR, then only SCell #1 may perform BFR on SCell based on the order of the list. It is noted that BFR-On-SCell-Order may not contain all the SCellIDs of active SCells of the UE 102. The rules may include an explicit indication on whether a particular SCell supports BFR or not.

In one implementation, another RRC parameter (e.g., BFR-On-SCell) may be configured by the base station 104 for each SCell in the SCell configuration of RRC signaling.

It should be noted that BFR on SCell may refer to monitoring corresponding RadioLinkMonitoringRS quality for declaring beam failure for the SCell, and beam failure recovery request (BFRQ) transmission on that SCell which may be transmitted on PRACH, PUCCH or other physical channel/signals for performing beam failure recovery (or link recovery). Moreover, BFR on SCell may also include the receiving of the response of BFRQ on SCell, wherein the recoverySearchSpaceId may be configured on BFR-related RRC parameter of each SCell configuration.

In some implementations, there may also be implicit indications by which the UE 102 can determine whether a particular SCell supports BFR or not. In one example, an implicit indication may be based on the PDSCH configuration of each SCell. If there is no BFR related RRC parameter(s), such as BFR candidate RS(s) or BFR monitor RS(s) associated with SCell(s), then the UE 102 may consider the SCell as not supporting BFR. It is noted that the order of BFR on SCell(s) and the indication of BFR on SCell(s) may exist simultaneously.

In another implementation, the UE 102 may select one or more SCells for BFR based on the mobility of the UE 102. It is noted that the mobility of the UE 102 may be determined by Layer-3 mobility state estimation or Layer-1 beam switching report. In the case of Layer-3 mobility state estimation, it may contain a history of camped cell(s) or serving SSB(s). If the UE 102 is in a high mobility state, the UE 102 may prioritize SCell(s) with lower frequency(ies) as it may be relatively difficult to perform BFR successfully on higher frequency SCell(s) due to narrow beam operation and high mobility of the UE 102. For the case of Layer-1 beam switching report, it may reflect the status of beam switching frequency based on the corresponding measured event and measurement report configuration of each SCell. Thus, the UE 102 may select an SCell to perform BFR that has a better chance to succeed.

In another implementation, all the SCells of the UE 102 may be pre-configured with the BFR-related RRC parameters, such as BFR-candidate-RSs, Beam-failure-candidate-beam-threshold, failure detection resources (failureDetectionResources), and contention-free random access (CFRA) resource(s) for BFR. The base station 104 may inform the UE 102, using a MAC-CE, in which SCell(s) the UE may perform BFR based on the pre-configured BFR-related RRC parameters. For example, the BFR-related RRC parameters of the SCell(s) may be activated after the UE 102 receives a MAC-CE for SCell-BFR-Activation, which may contain a corresponding SCellID of the SCell.

In another implementation, a PDCCH order for triggering CFRA or CBRA for BFR may contain a Carrier Frequency Indicator (CFI) IE. After receiving the CFI IE, the UE 102 may perform BFR on the SCell(s) based on the PDCCH order indicated by the CFI IE.

It should be noted that a MAC-CE or DCI for triggering one or more SCells for BFR on SCell may be transmitted either before or after a beam failure is detected on one of the SCells. If the MAC-CE or DCI for triggering the SCell(s) for BFR on SCell is transmitted after a beam failure is detected, the UE may assume that the MAC-CE or DCI is to be received on the PCell.

In another implementation, it may be up to the base station 104's implementation to identify one or more SCells to be configured with BFR related parameters (e.g., monitoring RS, recovery resources, recovery event, etc.). The UE 102 may only perform BFR on the SCell(s) or for the SCell(s) which are configured with the BFR related parameters. It is noted that a component carrier (CC) index may be appended in the BFR configuration to signal a target/configured SCell for the UE 102. For other SCells that are not configured with any BFR parameters, the UE 102 may consider an SCell failure when it can't decode the PDCCH (e.g., beam failure), and signal the failure to the base station 104 through the PCell (e.g., no further beam management will be applied). Beam failure may be considered as an implicit condition for deactivation of the corresponding SCell. The UE 102 may deactivate the SCell when beam failure occurs. The base station 104 may later signal an activation MAC CE to activate the SCell again if needed. After receiving the activation command, the UE 102 may perform beam management in that SCell to identify a new appropriate beam for associated transmission.

In another implementation, in a situation where at least two BWPs are activated simultaneously, the abovementioned solutions may be applied where the UE 102 or base station 104 can select one of the BWPs to perform BFR. For example, only the selected BWP configured with BFR parameters may perform BFR. For a BWP not configured with BFR parameters, the UE 102 may report the failure via another BWP and suspend the BWP along with related beam management. Upon receiving an activation CE or DCI, the UE 102 may re-start the beam management on the BWP.

In another implementation, the network may allow the base station 104 to configure multiple SCells to perform BFR on SCell. In such a case, the SCells configured to the UE 102 may be grouped (e.g., into an SCell subset). It should be noted that the grouping may be done explicitly by indicating an SCell group index through RRC signaling, or implicitly according to the order of SCellIDs. For example, SCell #n, SCell #n+1 and SCell #n+2 are a subset of SCells, and SCell #n is the SCell which is able to perform BFR on SCell. In another implementation, the SCell subset is grouped based on the frequency bands of the SCells. For example, the SCells operating on neighboring frequency bands (e.g., a close absolute radio frequency channel number (ARFCN) value, or in the same frequency range) may be grouped together by pre-defined rules. Each subset of SCells has at least one SCell which is able to perform BFR on SCell. When any of the SCells in the subset detects/encounters beam failure, the UE 102 may apply BFR on SCell indicated by BFR-on-SCell (e.g., True means allow) in SCell configuration of RRC signaling. It is noted that only the SCell(s) allowed for BFR on SCell are configured with BFR-related parameters, and the beam failure detection of other SCells are based on RLM-RS or whether PDCCH decoding is successful or not.

The candidate beam selection may be based on the BFR-candidate-RSs on the SCells with BFR-related parameters. Moreover, the CFRA for BFR on the SCells with BFR-related parameters may include SCellIDs corresponding to the SCells detecting/encountering beam failures. If the CFRA(s) for BFR on the SCells with BF-related parameters do not contain any SCellIDs, the base station may consider that this BFRQ is for all the SCells in the subset of the SCells that support BFR on SCell or BFRQ transmission on SCell.

Figure 2:
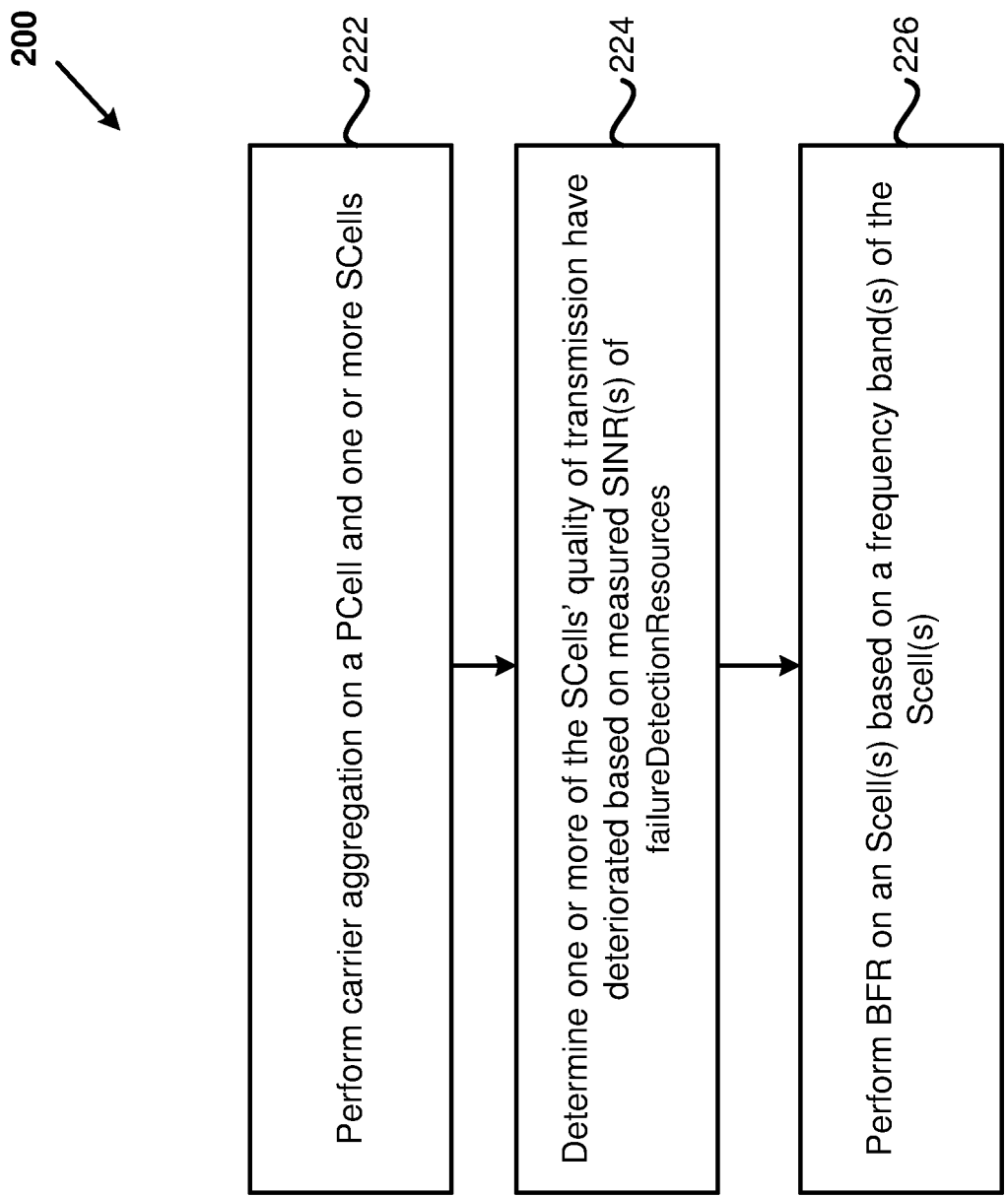
FIG. 2 is a flowchart illustrating a method for a UE to select an SCell for performing BFR based on frequency band, in accordance with an example implementation of the present application.

FIG. 2 is a flowchart of a method for a UE to select an SCell for performing BFR based on frequency band, in accordance with an example implementation of the present disclosure. As illustrated in FIG. 2, the flowchart 200 includes actions 222, 224, and 226.

In action 222, a UE may be configured to perform carrier aggregation on a PCell and one or more SCells. In one implementation, the UE may correspond to the UE 102 in FIG. 1. The PCell and SCells may be formed by one or more base stations, such as the base station 104 in FIG. 1. The PCell is on a first frequency band (e.g., with a center frequency at 700 MHz). SCell #1 is on a second frequency band (e.g., with a center frequency at 1800 MHz). SCell #2 is on a third frequency band (e.g., with a center frequency at 3600 MHz). SCell #3 is on a fourth frequency band (e.g., with a center frequency at 6000 MHz). In one implementation, all of the SCells are applied with analog beam operation. In another implementation, all of the SCells are applied with digital beam operation. In yet another implementation, all of the SCells are applied with a combination of analog and digital beam operation.

In action 224, the UE may determine that one or more of the SCells' quality of transmission have deteriorated based on measured SINR of failureDetectionResources. For example, the UE determines that the quality of transmission in SCell #1 and SCell #3 have deteriorated, for example, based on the measured SINR of the failure detection resources (failureDetectionResources). One or more of the failure detection resources may include an RS ID. The UE may monitor these resources to detect beam failures.

In action 226, the UE may perform BFR on an SCell based on a frequency band of the SCell. For example, the UE may perform BFR on SCell #1 because the frequency band of SCell #1 is lower SCell #3. The UE may perform BFR on PCell for SCell #3.

Figure 3:
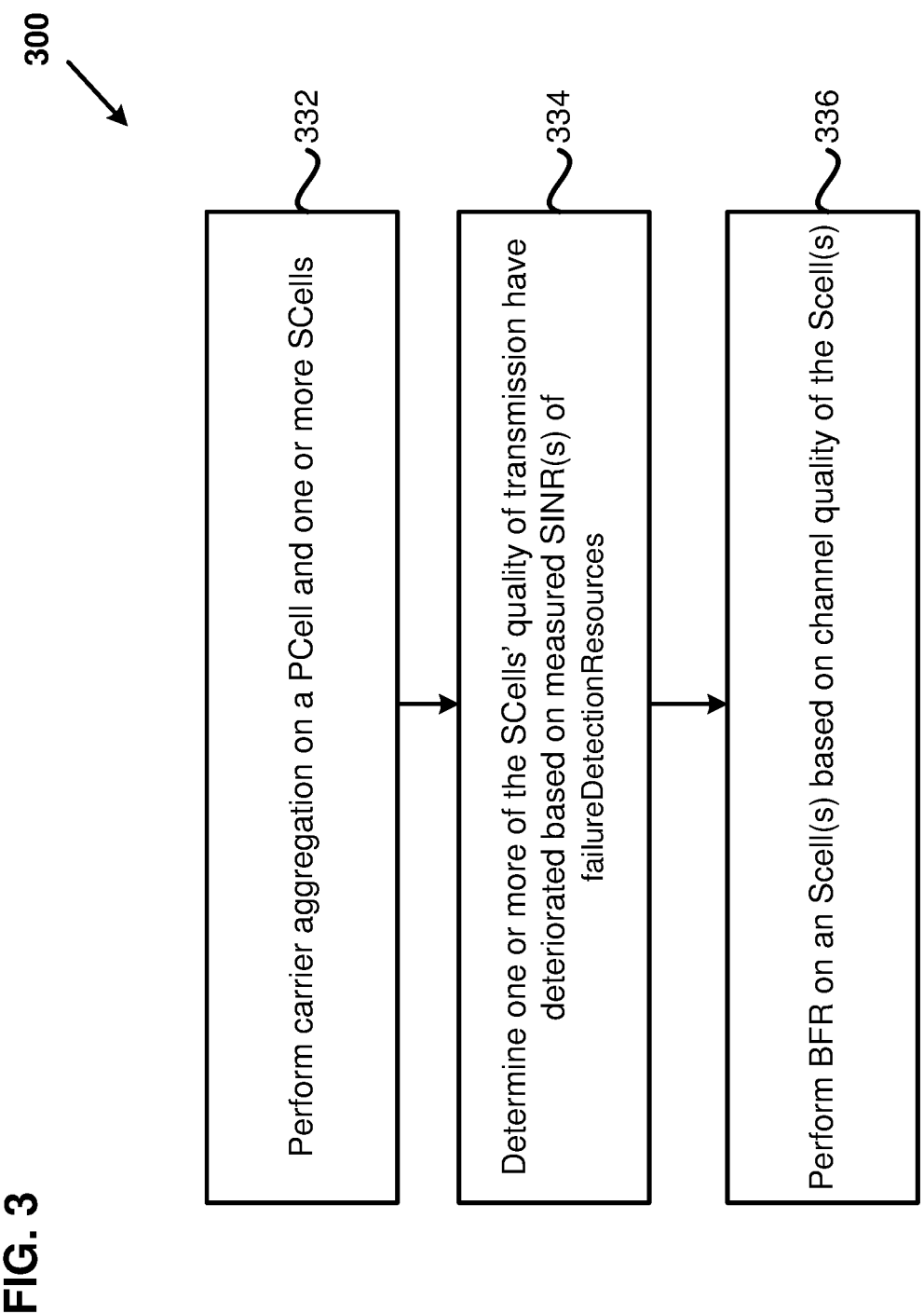
FIG. 3 is a flowchart illustrating a method for a UE to select an SCell for performing BFR based on channel quality, in accordance with an example implementation of the present application.

FIG. 3 is a flowchart of a method for a UE to select an SCell for performing BFR based on channel quality, in accordance with an example implementation of the present disclosure. As illustrated in FIG. 3, the flowchart 300 includes actions 332, 334, and 336.

In action 332, a UE may be configured to perform carrier aggregation on a PCell and one or more SCells. In one implementation, the UE may correspond to the UE 102 in FIG. 1. The PCell and SCells may be formed by one or more base stations, such as the base station 104 in FIG. 1. The PCell is on a first frequency band (e.g., with a center frequency at 700 MHz). SCell #1 is on a second frequency band (e.g., with a center frequency at 1800 MHz). SCell #2 is on a third frequency band (e.g., with a center frequency at 3600 MHz). SCell #3 is on a fourth frequency band (e.g., with a center frequency at 6000 MHz). In one implementation, all of the SCells are applied with analog beam operation. In another implementation, all of the SCells are applied with digital beam operation. In yet another implementation, all of the SCells are applied with a combination of analog and digital beam operation. In the present implementation, all of the SCells are configured with BFR-candidate-RSs.

In action 334, the UE may determine that one or more of the SCells' quality of transmission have deteriorated based on measured SINR of failureDetectionResources. For example, the UE determines that the quality of transmission in SCell #1 and SCell #3 have deteriorated, for example, based on the measured SINR of the failure detection resources (failureDetectionResources). One or more of the failure detection resources may include an RS ID. The UE may monitor these resources to detect beam failures.

In action 336, the UE may perform BFR on an SCell(s) based on channel quality of the SCell(s). For example, the UE measures the BFR-candidate-RSs in SCell #1 and SCell #3, and determines that the BFR-candidate-RSs with maximum L1-RSRP in SCell #1 is SSB #1 (e.g., −50 dB). On the other hand, the BFR-candidate-RSs with maximum L1-RSRP in SCell #3 is SSB #2 (e.g., −60 dB). In the present implementation, it is assumed that the beam-failure-candidate-beam-threshold of SCell #1 is −55 dB and the beam-failure-candidate-beam-threshold of SCell #3 is −70 dB. As such, the UE selects SCell #3 to perform BFR on SCell based on the difference between maximum L1-RSRP of BFR-candidate-RSs and the beam-failure-candidate-beam-threshold. The UE may also perform BFR on PCell for SCell #3.

Figure 4:
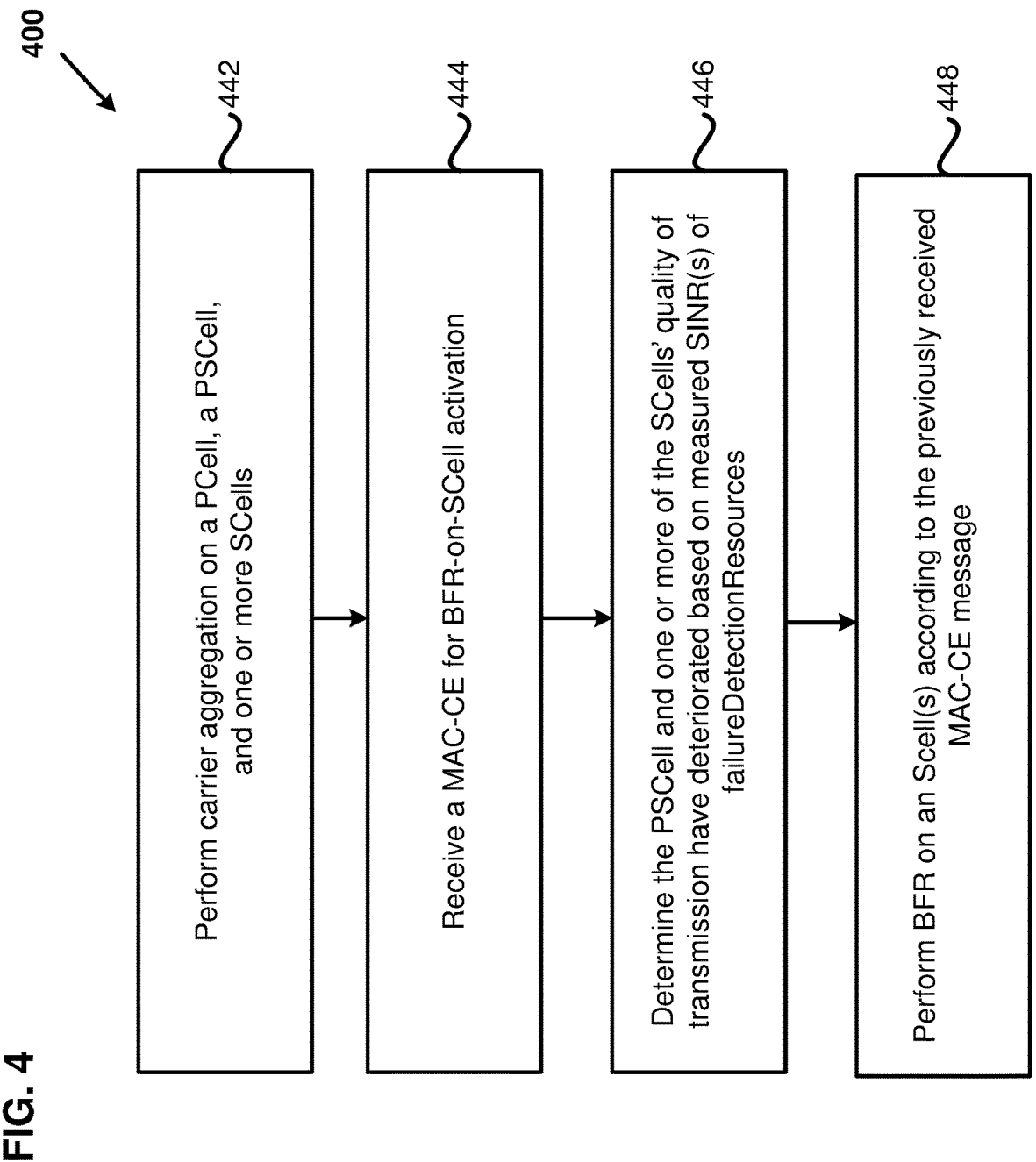
FIG. 4 is a flowchart illustrating a method for a UE to select an SCell for performing BFR based on a MAC-CE received before a beam failure is detected, in accordance with an example implementation of the present application.

FIG. 4 is a flowchart of a method for a UE to select an SCell for performing BFR based on a MAC-CE received before a beam failure is detected, in accordance with an example implementation of the present disclosure. As illustrated in FIG. 4, the flowchart 400 includes actions 442, 444, 446, and 448.

In action 442, a UE may be configured to perform carrier aggregation on a PCell, a PSCell, and one or more SCells. In one implementation, the UE may correspond to the UE 102 in FIG. 1. The PCell, PSCell, and SCells may be formed by one or more base stations, such as the base station 104 in FIG. 1. The PCell is on a first frequency band (e.g., with a center frequency at 700 MHz). The PSCell (e.g., SCell #1) is on a second frequency band (e.g., with a center frequency at 1800 MHz). SCell #2 is on a third frequency band (e.g., with a center frequency at 3600 MHz). SCell #3 is on a fourth frequency band (e.g., with a center frequency at 6000 MHz). In one implementation, all of the SCells are applied with analog beam operation. In another implementation, all of the SCells are applied with digital beam operation. In yet another implementation, all of the SCells are applied with a combination of analog and digital beam operation. In the present implementation, a base station (e.g., the base station 104 in FIG. 1) may configure BFR-related RRC parameters for all SCells.

In action 444, the UE may receive a MAC-CE for BFR-on-SCell activation. For example, the UE receives a MAC-CE for BFR-on-SCell activation, and the MAC-CE indicates that the UE may support BFR on SCell in SCell #2 among the SCells.

In action 446, the UE may determine that the PSCell and/or one or more of the SCells' quality of transmission have deteriorated based on measured SINRs of failureDetectionResources. For example, the UE determines that the quality of transmission in SCell #2, SCell #3, and PSCell have deteriorated based on the measured SINRs of the failure detection resources (failureDetectionResources). One or more of the failure detection resources may include an RS ID. The UE may monitor these resources to detect beam failures.

In action 448, the UE may perform BFR on an SCell(s) according to the previously received MAC-CE, where the MAC-CE is received in action 444 before the beam failure is detected. For example, the UE may performs BFR on SCell #2 according to the previously received MAC-CE. The UE may also perform BFR on PSCell for PSCell, and BFR on PCell for SCell #3.

Figure 5:
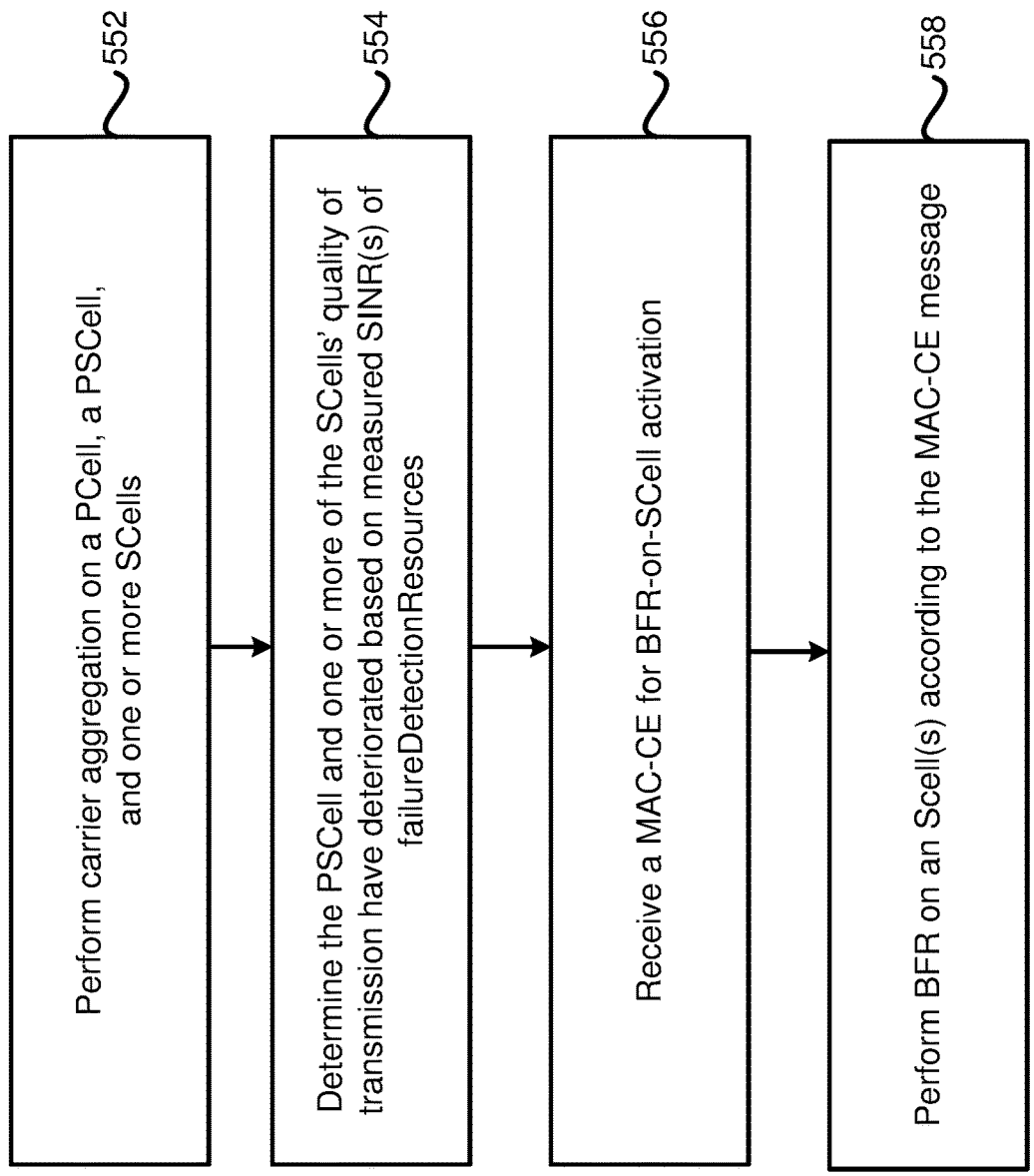
FIG. 5 is a flowchart illustrating a method for a UE to select an SCell for performing BFR based on a MAC-CE received after a beam failure is detected, in accordance with an example implementation of the present application.

FIG. 5 is a flowchart of a method for a UE to select an SCell for performing BFR based on a MAC-CE received after a beam failure is detected, in accordance with an example implementation of the present disclosure. As illustrated in FIG. 5, the flowchart 500 includes actions 552, 554, 556, and 558.

In action 552, a UE may be configured to perform carrier aggregation on a PCell, a PSCell, and one or more SCells. In one implementation, the UE may correspond to the UE 102 in FIG. 1. The PCell, PSCell, and SCells may be formed by one or more base stations, such as the base station 104 in FIG. 1. The PCell is on a first frequency band (e.g., with a center frequency at 700 MHz). The PSCell (e.g., SCell #1) is on a second frequency band (e.g., with a center frequency at 1800 MHz). SCell #2 is on a third frequency band (e.g., with a center frequency at 3600 MHz). SCell #3 is on a fourth frequency band (e.g., with a center frequency at 6000 MHz). In one implementation, all of the SCells are applied with analog beam operation. In another implementation, all of the SCells are applied with digital beam operation. In yet another implementation, all of the SCells are applied with a combination of analog and digital beam operation. In the present implementation, a base station (e.g., the base station 104 in FIG. 1) may configure BFR-related RRC parameters for all SCells.

In action 554, the UE may determine that the PSCell and/or one or more of the SCells' quality of transmission have deteriorated based on measured SINR of failureDetectionResources. For example, the UE determines that the quality of transmission in SCell #2, SCell #3, and PSCell have deteriorated based on the measured SINRs of the failure detection resources (failureDetectionResources). One or more of the failure detection resources may include an RS ID. The UE may monitor these resources to detect beam failures.

In action 556, the UE may receive a MAC-CE for BFR-on-SCell activation. For example, the UE receives a MAC-CE on PCell for BFR-on-SCell activation, and the MAC-CE indicates that the UE may support BFR on SCell in SCell #2 among the SCells.

In action 558, the UE may perform BFR on an SCell(s) according to the MAC-CE, where the MAC-CE is received in action 556 after the beam failure is detected. For example, the UE performs BFR on SCell #2 according to the received MAC-CE. The UE may also perform BFR on PSCell for PSCell, and BFR on PCell for SCell #3.

Figure 6:
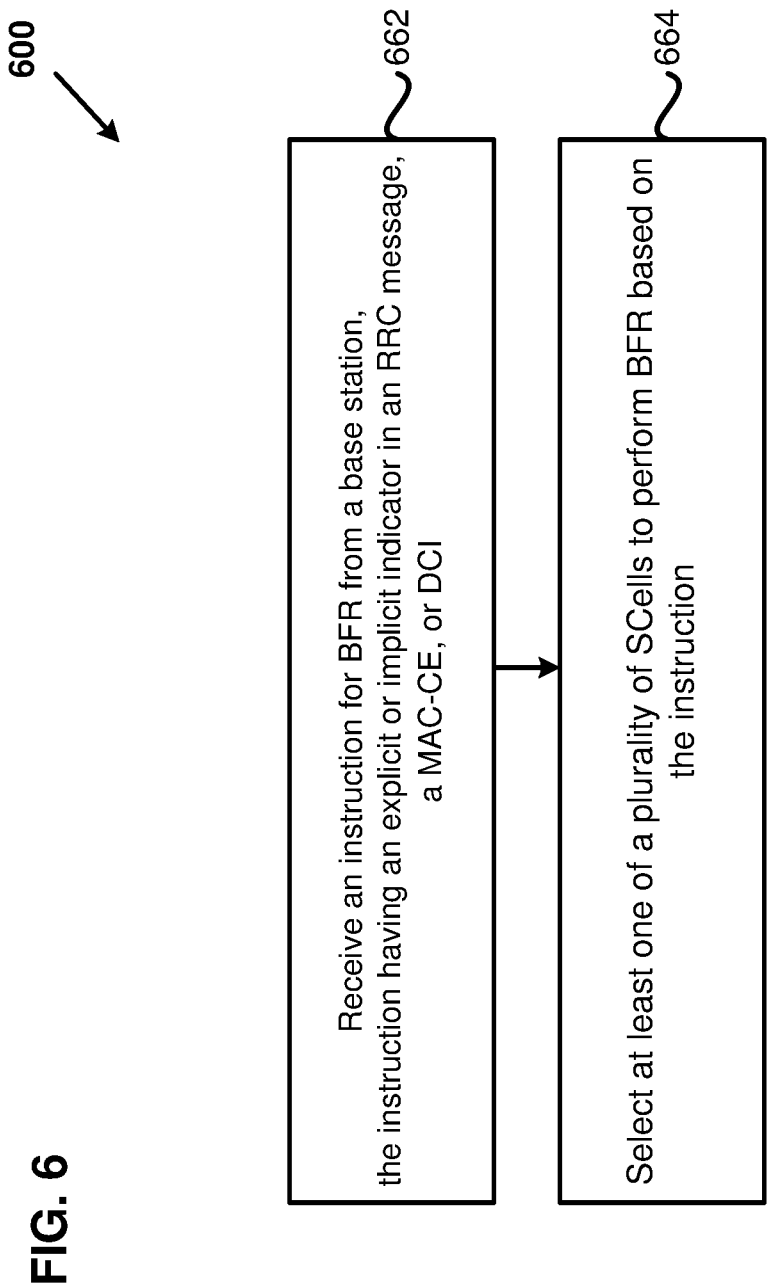
FIG. 6 is a flowchart illustrating a method for BFR by a UE, in accordance with an example implementation of the present application.

FIG. 6 is a flowchart illustrating a method for BFR by a UE, in accordance with an example implementation of the present application. As illustrated in FIG. 6, the flowchart 600 includes actions 662 and 664. In action 662, a UE may receive an instruction for BFR from a base station, where the instruction may include an explicit or implicit indicator in an RRC message, a MAC-CE, or DCI. The instruction may include the BFR related parameters, such as the ones described above with reference to FIGS. 1 through 5. In one implementation, the UE may correspond to the UE 102 in FIG. 1. The base station may correspond to the base station 104 in FIG. 1. In action 664, the UE may select at least one of a plurality of SCells to perform BFR based on the instruction.

In one implementation, the instruction may include an explicit indicator indicating whether each of the plurality of SCells supports BFR. The explicit indicator is included in the RRC message.

In one implementation, the instruction may include an explicit indicator indicating whether each of the plurality of SCells supports BFR based on a corresponding SCell ID in the MAC-CE.

In one implementation, the instruction may include an implicit indicator indicating whether each of the plurality of SCells supports BFR based on a corresponding BFR-related RRC parameter in the RRC message. The BFR-related RRC parameter contains at least one of: one or more BFR-candidate-reference signals, a beam-failure-candidate-beam-threshold, or one or more reference signal identifiers (IDs) for failure detection resources (failureDetectionResources).

In one implementation, the instruction may include one or more implicit indicators each corresponding to an AFRCN value in frequencyInfoDL of each of the plurality of SCells, where an SCell having a higher ARFCN value has a higher priority over an SCell having a lower ARFCN value to perform BFR.

In one implementation, the UE selects the at least one of the plurality of SCells, when the instruction indicates that one or more BFR-related parameters are configured for the at least one of the plurality of SCells. The BFR-related RRC parameter contains at least one of: one or more BFR-candidate-reference signals, a beam-failure-candidate-beam-threshold, or one or more reference signal identifiers (IDs) for failure detection resources (failureDetectionResources).

In one implementation, the instruction may include a list of SCell identifiers (IDs) corresponding to the plurality of SCells; or one or more BFR-related parameters.

In one implementation, the instruction may include a carrier frequency indicator (CFI) information element (IE), and the UE selects the at least one of the plurality of SCells based on the CFI IE.

In one implementation, the plurality of SCells is grouped into at least one subset based on: an explicit indication in RRC signaling, an implicit indication based on an order of SCellIDs in an SCellID list, an absolute radio frequency channel number (AFRCN) value in frequencyInfoDL, a frequency range (FR), or a preamble of contention free random access (CFRA) for BFR, the preamble having one or more SCellIDs corresponding to one or more SCells detecting beam failures. When the preamble of CFRA for BFR does not contain any of the one or more SCellIDs, the base station considers all of the at least one subset of the plurality of SCells as detecting beam failure.

Figure 7:
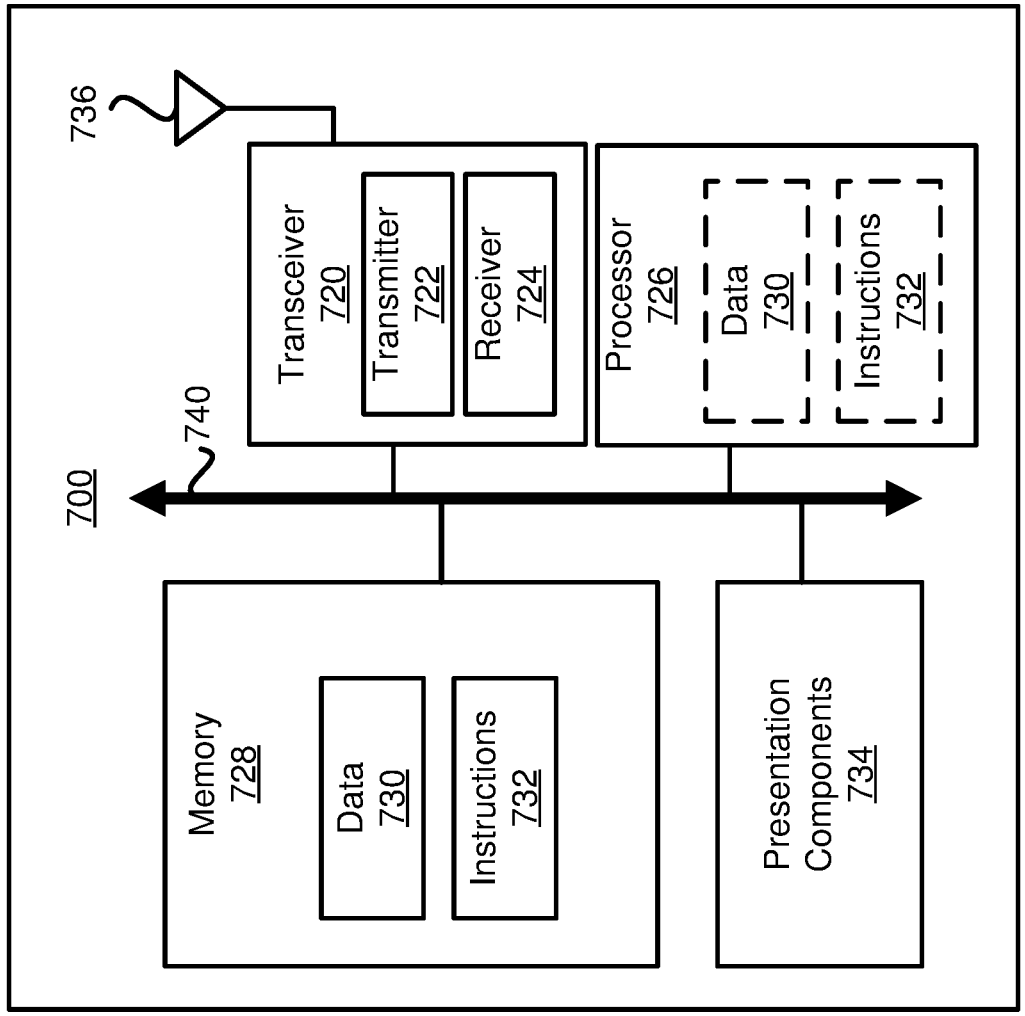
FIG. 7 is a block diagram illustrating a node for wireless communication, in accordance with various aspects of the present application.

FIG. 7 illustrates a block diagram of a node for wireless communication, in accordance with various aspects of the present application. As shown in FIG. 7, node 700 may include transceiver 720, processor 726, memory 728, one or more presentation components 734, and at least one antenna 736. Node 700 may also include a Radio Frequency (RF) spectrum band module, a base station communications module, a network communications module, and a system communications management module, input/output (I/O) ports, I/O components, and power supply (not explicitly shown in FIG. 7). Each of these components may be in communication with each other, directly or indirectly, over one or more buses 740.

Transceiver 720 having transmitter 722 and receiver 724 may be configured to transmit and/or receive time and/or frequency resource partitioning information. In some implementations, transceiver 720 may be configured to transmit in different types of subframes and slots including, but not limited to, usable, non-usable and flexibly usable subframes and slot formats. Transceiver 720 may be configured to receive data and control channels.

Node 700 may include a variety of computer-readable media. Computer-readable media can be any available media that can be accessed by node 700 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 728 may include computer-storage media in the form of volatile and/or non-volatile memory. Memory 728 may be removable, non-removable, or a combination thereof. Exemplary memory includes solid-state memory, hard drives, optical-disc drives, and etc. As illustrated in FIG. 7, memory 728 may store computer-readable, computer-executable instructions 732 (e.g., software codes) that are configured to, when executed, cause processor 726 to perform various functions described herein, for example, with reference to FIGS. 1 through 6. Alternatively, instructions 732 may not be directly executable by processor 726 but be configured to cause node 700 (e.g., when compiled and executed) to perform various functions described herein.

Processor 726 may include an intelligent hardware device, e.g., a central processing unit (CPU), a microcontroller, an ASIC, and etc. Processor 726 may include memory. Processor 726 may process data 730 and instructions 732 received from memory 728, and information through transceiver 720, the base band communications module, and/or the network communications module. Processor 726 may also process information to be sent to transceiver 720 for transmission through antenna 736, to the network communications module for transmission to a core network.

One or more presentation components 734 presents data indications to a person or other device. Exemplary one or more presentation components 734 include a display device, speaker, printing component, vibrating component, and etc.

From the above description it is manifest that various techniques can be used for implementing the concepts described in the present application without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for beam failure recovery (BFR) by a user equipment (UE), the method comprising: receiving, a medium access control (MAC) control element (CE) from a base station; performing BFR upon at least one of a plurality of selected secondary, cells (SCells) based on the received MAC CE; wherein the MAC CE indicates whether each of the plurality of selected SCells supports BFR based on one or more BFR-related radio resource control (RRC), parameters in an RRC message, and wherein the one or more BFR-related RRC parameters contain at least one of: one or more BFR-candidate-reference signals; a beam-failure-candidate-beam-threshold; and one or more reference signal identifiers (IDs) for failure detection resources (failureDetectionResources).

2. The method of claim 1, wherein the MAC CE is configured by a base station.

3. The method of claim 1, wherein:
the MAC CE determines a priority based on an absolute radio frequency channel number (AFRCN) value broadcast by each of the plurality of selected SCells; and
an SCell having a higher ARFCN value has a higher priority over an SCell having a lower ARFCN value to perform BFR.

4. The method of claim 1, further comprising:
selecting the at least one of the plurality of selected SCells, when an instruction indicates that the one or more BFR-related parameters are configured for the at least one of the plurality of selected SCells.

5. The method of claim 1, wherein the MAC CE includes at least one of:
a list of SCell identifiers (IDs) corresponding to the plurality of selected SCells; and
the one or more BFR-related parameters.

6. The method of claim 1, wherein the MAC CE includes a carrier frequency indicator (CFI) information element (IE), and the UE selects the at least one of the plurality of selected SCells based on the CFI IE.

7. The method of claim 1, wherein the plurality of selected SCells is grouped into at least one subset based on:
an explicit indication in RRC signaling;
an implicit indication based on an order of SCellIDs in an SCellID list;
an absolute radio frequency channel number (AFRCN) value in frequencyInfoDL;
a frequency range (FR); and
a preamble of contention free random access (CFRA) for BFR, the preamble having one or more SCellIDs corresponding to one or more SCells detecting beam failures.

8. The method of claim 7, wherein when the preamble of CFRA for BFR does not contain any of the one or more SCellIDs, the base station considers all of the at least one subset of the plurality of selected SCells as detecting beam failure.

9. A user equipment (UE) comprising: one or more non-transitory computer-readable media having computer-executable instructions embodied thereon; at least one processor coupled to the one or more non-transitory computer-readable media, and configured to execute the computer-executable instructions to; receive a medium access control (MAC) control element (CE) from a base station; perform beam failure recovery (BFR) upon at least one of a plurality of selected secondary cells (SCells) based on the received MAC CE; wherein the plurality of selected SCells is grouped into at least one subset based on: an explicit indication in radio resource control (RRC) signaling, an implicit indication based on an order of SCellIDs in an SCellID list; an absolute radio frequency channel number (AFRCN) value in frequencyInfoDL; a frequency range (FR); and a preamble of contention free random access (CFRA) for BFR, the preamble having one or more SCellIDs corresponding to one or more SCells detecting beam failures; and wherein when the preamble of CFRA for BFR does not contain any of the one or more SCellIDs, the base station considers all of the at least one subset of the plurality of SCells as detecting beam failure.

10. The UE of claim 9, wherein:
the MAC CE indicates whether each of the plurality of selected SCells supports BFR based on one or more BFR-related RRC parameters in an RRC message; and
the BFR-related RRC parameter contains at least one of:
one or more BFR-candidate-reference signals;
a beam-failure-candidate-beam-threshold; and one or more reference signal identifiers (IDs) for failure detection resources (failureDetectionResources).

11. The UE of claim 9, wherein:
the MAC CE determines a priority based on an absolute radio frequency channel number (AFRCN) value in frequencyInfoDL of each of the plurality of SCells;
an SCell having a higher ARFCN value has a higher priority over an SCell having a lower ARFCN value to perform BFR.

12. The UE of claim 9, wherein:
the at least one processor is further configured to execute the computer-executable instructions to select the at least one of the plurality of selected SCells, when the MAC CE indicates that one or more BFR-related parameters are configured for the at least one of the plurality of SCells; and
the one or more BFR-related parameters contain at least one of:
one or more BFR-candidate-reference signals;
a beam-failure-candidate-beam-threshold; and
one or more reference signal identifiers (IDs) for failure detection resources (failureDetectionResources).

13. The UE of claim 9, wherein the MAC CE includes at least one of:
a list of SCell identifiers (IDs) corresponding to the plurality of selected SCells; and
one or more BFR-related parameters.

14. The UE of claim 9, wherein:
the MAC CE includes a carrier frequency indicator (CFI) information element (IE); and
the UE selects the at least one of the plurality of selected SCells based on the CFI IE.

\* \* \* \* \*